(12) United States Patent
Kobayashi et al.

(10) Patent No.: US 8,302,388 B2
(45) Date of Patent: Nov. 6, 2012

(54) EXHAUST GAS TREATING METHOD AND APPARATUS

(75) Inventors: Kazuki Kobayashi, Hiroshima (JP);
Hirofumi Kikkawa, Hiroshima (JP);
Hiroshi Ishizaka, Hiroshima (JP);
Hiroshi Takezaki, Hiroshima (JP);
Hiroyuki Nosaka, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 752 days.

(21) Appl. No.: 12/516,845

(22) PCT Filed: Dec. 24, 2007

(86) PCT No.: PCT/JP2007/074765
§ 371 (c)(1),
(2), (4) Date: May 29, 2009

(87) PCT Pub. No.: WO2008/078721
PCT Pub. Date: Jul. 3, 2008

(65) Prior Publication Data
US 2010/0071348 A1    Mar. 25, 2010

(30) Foreign Application Priority Data
Dec. 27, 2006 (JP) ................................. 2006-353270

(51) Int. Cl.
*F01N 3/00* (2006.01)
(52) U.S. Cl. ................ 60/298; 60/274; 60/286; 60/295; 60/303; 60/309; 60/320; 422/105; 422/111; 422/169; 422/170; 423/210; 423/215.5; 423/239.1
(58) Field of Classification Search .................... 60/274, 60/276, 286, 295, 297, 298, 300, 303, 309, 60/311, 320; 422/105, 111, 168–172; 423/210, 423/215.5, 235, 239.1, 242.1
See application file for complete search history.

(56) References Cited

U.S. PATENT DOCUMENTS
4,586,940 A * 5/1986 Stubenvoll ...................... 95/207
(Continued)

FOREIGN PATENT DOCUMENTS
JP       2000-015057       1/2000
(Continued)

OTHER PUBLICATIONS

Tatsuhiro Fujii, et al., "Development and Practical Application of a Comprehensive Exhaust Gas Treating System for Bag Filter Type Municipal Waste Incinerator", Hitachi Zosen Technical Review, Hitachi Ship-building Corporation, Jun. 1992, vol. 53, No. 2, p. 23-30.

(Continued)

*Primary Examiner* — Binh Q Tran
(74) *Attorney, Agent, or Firm* — Greenblum & Bernstein, P.L.C.

(57) ABSTRACT

After adjusting an exhaust gas temperature at an exit of a heat recovery unit (11) of an exhaust gas treating apparatus to not more than a dew point temperature of sulfur trioxide ($SO_3$), a heavy metal adsorbent is supplied from a heavy metal adsorbent supply unit (16) disposed in an exhaust gas at an entrance of a precipitator (4) or an intermediate position within the precipitator (4), and the exhaust gas containing the heavy metal adsorbent is supplied into the precipitator (4). Preferably at this stage, the heavy metal adsorbent is supplied into the exhaust gas at the entrance of the precipitator (4) 0.1 seconds after the exhaust gas temperature at the exit of the heat recovery unit (11) has been adjusted to not more than the dew point temperature of $SO_3$. Further preferably, in order to prevent acid corrosion of equipment, the heavy metal adsorbent is supplied after spraying an alkali into the exhaust gas at the entrance or exit of the heat recovery unit (11) and adjusting the exhaust gas temperature at the exit of the heat recovery unit to not more than the dew point temperature of $SO_3$. Accordingly, even when coal with a high sulfur content is used as fuel, heavy metals in the exhaust gas can be removed effectively.

7 Claims, 12 Drawing Sheets

U.S. PATENT DOCUMENTS

| | | | | |
|---|---|---|---|---|
| 4,649,703 | A * | 3/1987 | Dettling et al. | 60/275 |
| 4,969,328 | A * | 11/1990 | Kammel | 60/275 |
| 5,125,230 | A * | 6/1992 | Leonard | 60/274 |
| 7,302,795 | B2 * | 12/2007 | Vetrovec | 60/309 |
| 7,507,381 | B2 | 3/2009 | Muramoto et al. | |
| 7,585,352 | B2 * | 9/2009 | Dunn | 95/73 |
| 2005/0201914 | A1 * | 9/2005 | Ritzenthaler | 423/230 |
| 2006/0099902 | A1 | 5/2006 | Kikkawa et al. | |
| 2008/0209899 | A1 | 9/2008 | Muramoto et al. | |
| 2009/0173234 | A1 | 7/2009 | Ueda et al. | |

FOREIGN PATENT DOCUMENTS

| | | |
|---|---|---|
| JP | 2000-325747 | 11/2000 |
| WO | 2004/023040 | 3/2004 |

OTHER PUBLICATIONS

U.S. Appl. No. 12/373,817, filed Jan. 14, 2009 to Nagai et al.

U.S. Appl. No. 12/516,835, filed May 29, 2009 Kobayashi et al.

* cited by examiner

F I G. 9
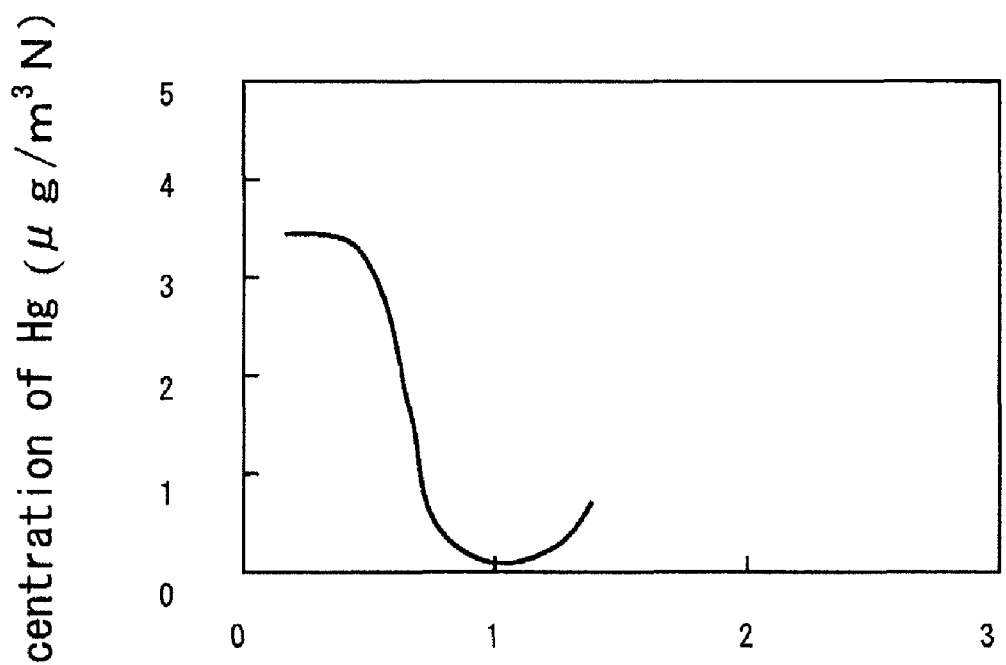

EXHAUST GAS TREATING METHOD AND APPARATUS

TECHNICAL FIELD

The present invention relates to an exhaust gas treating method and apparatus and particularly relates to an apparatus and a method, which are for reducing trace component concentrations in an exhaust gas discharged from a chimney and with which trace component removal performance in a dry precipitator is improved to remove trace heavy metal components in the exhaust gas.

BACKGROUND ART

Mercury and other heavy metals are contained in addition to nitrogen oxides and sulfur oxides in an exhaust gas discharged from a thermal power plant boiler, etc., which is a combustion apparatus that uses coal or other fossil fuel. Although the nitrogen oxides are removed by NOx removal equipment and the sulfur oxides are removed by a desulfurizer, mercury, selenium, cadmium, chromium, lead, zinc, and other heavy metals cannot be removed by the NOx removal equipment or desulfurizer and cannot be trapped completely by a precipitator for removing soot/dust in the exhaust gas. Because these heavy metals are high in toxicity, emission restrictions thereof have recently become stricter. Methods for removing heavy metals contained in the exhaust gas, particularly mercury, which is high in toxicity, are being examined.

FIG. 11 illustrates one such method and shows an exhaust gas treating system applied to remove mercury in an exhaust gas from a waste incinerator or other combustion furnace 1. With this exhaust gas treating system, the exhaust gas from the combustion furnace 1 is first treated by NOx removal equipment 2 to remove nitrogen oxides, and combustion air to be used in the combustion furnace 1 is then heated by the exhaust gas in an air preheater 3. Soot/dust in the exhaust gas discharged from the air preheater 3 are then trapped by a precipitator 4, the exhaust gas discharged from the precipitator 4 is guided by an induction fan 5 to a wet flue gas desulfurizer 6 to remove sulfur oxides in the exhaust gas, and the exhaust gas is discharged by a boost-up fan 7 into air from a chimney 8. A measurement unit 9 for measuring concentrations of the sulfur oxides, nitrogen oxides, heavy metals (Hg), etc., in the exhaust gas is disposed at an upstream side of the chimney 8 to monitor concentrations of these components in the exhaust gas.

The exhaust gas treating system of FIG. 11 is characterized in that a mercury adsorbent from a mercury adsorbent supply unit 16 is added into the exhaust gas at an entrance of the precipitator 4, and with this exhaust gas treating system, the exhaust gas at the entrance of the precipitator 4 is in a temperature range (150 to 240° C.) in which a mercury adsorption performance of activated carbon, etc., is highest and the activated carbon, etc., to which mercury has become adsorbed, is recovered by the precipitator 4 (see, for example, Non-Patent Document 1, etc.).

FIG. 12 shows an exhaust gas treating system applied to removing mercury in an exhaust gas from a thermal power plant boiler, and with this system, heavy metal concentrations in the exhaust gas that is discharged to the atmosphere are adjusted to be within predetermined ranges by lowering an exhaust gas temperature.

With the exhaust gas treating system shown in FIG. 12, the exhaust gas from the boiler or other combustion apparatus 1 is supplied to the NOx removal equipment 2 to be removed of the nitrogen oxides and, is thereafter used for heating the combustion air in the air preheater 3. A heating medium in a heat recovery unit 11 is then heated by the exhaust gas discharged from the air preheater 3, the soot/dust in the exhaust gas that has been lowered in temperature and is discharged from the heat recovery unit 11 are trapped efficiently by the precipitator 4, and the exhaust gas discharged from the precipitator 4 is guided by the induction fan 5 to the wet flue gas desulfurizer 6 to be desulfurized. The exhaust gas discharged from the wet flue gas desulfurizer 6 is reheated by a reheater 13 using the heating medium that is circulatingly supplied from the heat recovery unit 11 via heating medium circulating ducts 15-1 and 15-2, and is discharged by the boost-up fan 7 into air from the chimney 8 (Patent Document 1). The measurement unit 9 for measuring the concentrations of the sulfur oxides, nitrogen oxides, heavy metals, etc., in the exhaust gas before discharge from the chimney 8 is also disposed in the system shown in FIG. 12 to monitor the concentrations of these components in the exhaust gas.

The exhaust gas treating system shown in FIG. 12 makes use of the fact that the heavy metals in the exhaust gas become attached more readily to solid surfaces of ash particles, etc., the lower the exhaust gas temperature, and the heavy metals in the ash particles can be recovered by an appropriate method or a treatment for preventing elution from the ash particles can be applied. In Patent Document 1, it is disclosed that a heavy metal concentration in the exhaust gas can be suppressed by a method of measuring the concentration of the heavy metal (Hg) in the exhaust gas discharged from the wet flue gas desulfurizer 6 in the exhaust gas treating system shown in FIG. 12 and adjusting one or more among: a pH of an absorbing solution used in the wet flue gas desulfurizer 6; an oxidizing air flow rate; and a wastewater flow rate; so that a measurement value of the heavy metal concentration falls within a predetermined range.

Non-Patent Document 1: Tatsuhiro Fujii and six others, "Development and Practical Application of a Comprehensive Exhaust Gas Treating System for Bag Filter Type Municipal Waste Incinerator," Hitachi Zosen Technical Review, Hitachi Shipbuilding Corporation, June, 1992, Vol. 53, No. 2, p. 23-30.

Patent Document 1: International Patent Publication No. 2004/023040 Pamphlet

DISCLOSURE OF INVENTION

Problems to be Solved by the Invention

According to findings by the present inventors, with the exhaust gas treating system described in Non-Patent Document 1 described above, in a case where coal that contains a high amount of sulfur is used as the fuel of the boiler, etc., the heavy metals in the exhaust gas generated are hardly adsorbed by the activated carbon that is the adsorbent and remain contained as they are in the exhaust gas that is supposed to have been subject to exhaust gas treatment. It was also found that with the exhaust gas treating system described in Patent Document 1, the heavy metals in the exhaust gas are not recovered much even if the exhaust gas temperature is lowered in the case where coal that contains a high amount of sulfur is used as the fuel of the boiler, etc.

An object of the present invention is to provide an exhaust gas treating method and apparatus that effectively removes heavy metals in an exhaust gas even in a case where coal that contains a high amount of sulfur is used as a fuel.

Means for Solving the Problems

The object of the present invention can be achieved by the following.

A first aspect of the present invention provides an exhaust gas treating method including the steps of: preheating a combustion air of a combustion apparatus 1 by an exhaust gas discharged from the combustion apparatus 1; recovering heat from the exhaust gas by a heat recovery unit 11 after the air preheating; and recovering soot/dust in the exhaust gas at an exit of the heat recovery unit 11 by a dry precipitator 4; and with this method, after adjusting an exhaust gas temperature at the exit of the heat recovery unit 11 to not more than a dew point temperature of sulfur trioxide, a heavy metal adsorbent is supplied into the exhaust gas at an entrance of the dry precipitator 4 or into an intermediate position within the dry precipitator 4.

A second aspect of the present invention provides the exhaust gas treating method according to the first aspect where a nitrogen oxide in the exhaust gas is denitrated by a denitration catalyst before the air preheating and a sulfur oxide in the exhaust gas is desulfurized at the exit of the dry precipitator.

A third aspect of the present invention provides the exhaust gas treating method according to the second aspect where the heat of the exhaust gas is recovered in a heating medium in the heat recovery unit 11, the heating medium is circulatingly supplied to a reheater 13, disposed for heating the desulfurized exhaust gas by the heating medium supplied from the heat recovery unit 11, or to a cooler 25, disposed for cooling the heating medium supplied from the heat recovery unit 11, and after adjusting the exhaust gas temperature at the exit of the heat recovery unit 11 to not more than the dew point temperature of sulfur trioxide by at least one among a circulation amount of the circulating heating medium between the heat recovery unit 11 and the reheater 13, a heating amount of the heating medium, and a cooling amount of the heating medium, the heavy metal adsorbent is supplied into the exhaust gas at the entrance of the dry precipitator 4 or into the intermediate position within the dry precipitator 4.

A fourth aspect of the present invention provides the exhaust gas treating method according to the first aspect where the heavy metal adsorbent is supplied into the exhaust gas at the entrance of the dry precipitator 4 in 0.1 seconds after adjusting the exhaust gas temperature at the exit of the heat recovery unit 11 to not more than the dew point temperature of sulfur trioxide.

A fifth aspect of the present invention provides the exhaust gas treating method according to the first aspect where an alkali is sprayed into the exhaust gas at an entrance or exit of the heat recovery unit 11 and the heavy metal adsorbent is supplied after adjusting the exhaust gas temperature at the exit of the heat recovery unit 11 to not more than the dew point temperature of sulfur trioxide.

A sixth aspect of the present invention provides the exhaust gas treating method according to the fifth aspect where at least one among a sulfur trioxide concentration, a chlorine concentration, and a heavy metal concentration in the exhaust gas at the exit of the dry precipitator 4 is measured and an amount of the alkali that is in accordance with the measured concentration is supplied into the exhaust gas at the entrance of the heat recovery unit 11 or the exit of the heat recovery unit 11.

A seventh aspect of the present invention provides an exhaust gas treating apparatus including: an air preheater 3, preheating a combustion air of the combustion apparatus 1 by an exhaust gas discharged from the combustion apparatus 1; a heat recovery unit 11, recovering heat from the exhaust gas at an exit of the air preheater 3; and a dry precipitator 4, recovering soot/dust in the exhaust gas at an exit of the heat recovery unit 11, which are successively disposed from an upstream side to a downstream side of an exhaust gas duct of a combustion apparatus 1, and furthermore including: a controller 24, controlling an exhaust gas temperature at the exit of the heat recovery unit 11 to not more than a dew point temperature of sulfur trioxide; and a heavy metal adsorbent supply unit 16, supplying a heavy metal adsorbent into the exhaust gas at an entrance of the dry precipitator 4 or into an intermediate position within the dry precipitator 4.

An eighth aspect of the present invention provides the exhaust gas treating apparatus according to the seventh aspect, further including: NOx removal equipment 2, in turn including a denitration catalyst that denitrates the exhaust gas at an entrance of the air preheater 3; and a desulfurizer 6, desulfurizing the exhaust gas at the exit of the dry precipitator 4.

A ninth aspect of the present invention provides the exhaust gas treating apparatus according to the seventh aspect where the heat recovery unit 11 is made up of a set of heat exchanger tubes that recover the heat of the exhaust gas into a heating medium, and the exhaust gas treating apparatus further includes: a reheater 13, made up of a set of heat exchanger tubes that heat the exhaust gas at an exit of the desulfurizer 6 by the heating medium supplied from the heat recovery unit 11, or a cooler 25, made up of a set of heat exchanger tubes that cool the heating medium supplied from the heat recovery unit 11; a circulation line 15, making the heat exchanger tubes respectively disposed in the heat recovery unit 11 and the reheater 13 or the heat exchanger tubes respectively disposed in the heat recovery unit 11 and the cooler 25 communicate to make the heating medium circulate in interiors of the heat exchanger tubes; and an adjusting unit 10, adjusting, by the controller 24, one among a circulation amount of the heating medium flowing through the circulation line 15, a heating medium heating amount, and a heating medium cooling amount.

A tenth aspect of the present invention provides the exhaust gas treating apparatus according to the seventh aspect further including: an alkali supply unit 17, supplying an alkali into the exhaust gas at the entrance of the heat recovery unit 11 or the exit of the heat recovery unit 11.

An eleventh aspect of the present invention provides the exhaust gas treating apparatus according to the tenth aspect further including: measurement units 21 to 23, measuring at least one among a sulfur trioxide concentration, a chlorine concentration, and a heavy metal concentration in the exhaust gas at the exit of the dry precipitator 4; and an adjusting unit, adjusting, by the controller 24, an amount of the alkali supplied from the alkali supply unit 17 into the exhaust gas at the entrance of the heat recovery unit 11 or the exit of the heat recovery unit 11 in accordance with the measurement values of the measurement units 21 to 23.

As the heat recovery unit 11 mentioned in the first and seventh aspects, a configuration, where the set of heat exchanger tubes, through which the heating medium that recovers the heat of the exhaust gas flows, is disposed to perform heat exchange with a heat releasing equipment disposed separately from the above-described exhaust gas system, or a configuration, where the set of heat exchanger tubes, through which the heating medium flows, is not disposed and cooling water is sprayed directly inside the heat recovery unit, etc., is used.

As the desulfurizer 6 of the present invention, any one of the various types of desulfurizers, such as a wet flue gas desulfurizer, a dry flue gas desulfurizer, etc., may be used.

A portion of sulfur dioxide ($SO_2$) in an exhaust gas that is generated when a fossil fuel is combusted reacts with oxygen in the exhaust gas due to a catalytic action of a denitration catalyst, etc., and is converted to sulfur trioxide ($SO_3$). Although a conversion rate of sulfur dioxide ($SO_2$) to sulfur trioxide ($SO_3$) depends on conditions, it is approximately 1 to 3%. Although a concentration of sulfur dioxide ($SO_2$) in an exhaust gas discharged from a coal burning boiler, etc., is generally approximately 300 to 3000 ppm and thus a concentration of sulfur trioxide ($SO_3$) in the exhaust gas is approximately 3 to 90 ppm, with a high sulfur content coal, in which a sulfur concentration in coal exceeds 4%, the concentration of sulfur trioxide ($SO_3$) may exceed 100 ppm.

According to research by the present inventors, it is clear that in a case where a fossil fuel with a high sulfur content is combusted, heavy metals in the combustion exhaust gas cannot be removed effectively by the conventionally practiced exhaust gas treating systems disclosed in Non-Patent Document 1, Patent Document 1, etc.

Because as mentioned above, the amounts of sulfur oxides ($SO_2$ and $SO_3$) generated in the exhaust gas when a fossil fuel with a comparatively high sulfur content is combusted are high in comparison to the amounts of the sulfur oxides in the exhaust gas generated when a fuel of comparatively low sulfur content is combusted, the present inventors presumed the sulfur oxides in the exhaust gas to be an impediment against the removal of heavy metals. As a result of a continuing examination on the behavior of the sulfur oxides ($SO_2$ and $SO_3$) in the exhaust gas, a relationship between the generated amounts of the sulfur oxides and a heavy metal adsorption performance of activated carbon, which is a heavy metal adsorbent, etc., the following facts were found.

FIG. 5 shows a relationship between the temperature of an exhaust gas in a dry precipitator and the concentration of sulfur trioxide (entrance $SO_3$) in the exhaust gas for cases of combusting various types of coal (various types of coal differing in sulfur content), and here, a dew point of sulfur trioxide ($SO_3$) is determined by a water concentration and the sulfur trioxide ($SO_3$) concentration in the exhaust gas, being 147° C. when the water concentration in the exhaust gas is 10% and the sulfur trioxide ($SO_3$) concentration is 50 ppm and being approximately 162° C. when the water concentration in the exhaust gas is 15% and the sulfur trioxide ($SO_3$) concentration is 100 ppm.

According to FIG. 5, it can be understood that the sulfur trioxide ($SO_3$) concentration in the exhaust gas decreases significantly when the exhaust gas temperature decreases. This is because when the exhaust gas temperature decreases, the sulfur trioxide ($SO_3$) reacts with the water in the exhaust gas and condenses as sulfuric acid mist ($H_2SO_4$) so that hardly any sulfur trioxide ($SO_3$) remains in the exhaust gas.

The present inventors have already found that the sulfuric acid mist ($H_2SO_4$) that is thus generated under an atmosphere in which the temperature of the sulfur trioxide ($SO_3$) has decreased to not more than the dew point is adsorbed by ash particles that exists at a considerable amount in the exhaust gas (Japanese Published Unexamined Patent Application No. 2004-154683 ([0030], [0031])).

As mentioned above, the dew point of sulfur trioxide ($SO_3$) depends on the amounts of the sulfur trioxide ($SO_3$) and water, and whereas the dew point of sulfur trioxide ($SO_3$) in a case of an exhaust gas of a boiler in which coal with a normal sulfur content (coal with a sulfur concentration of not more than 3%) is combusted is 120 to 160° C., the dew point of sulfur trioxide ($SO_3$) in a case of an exhaust gas of a boiler in which coal with a high sulfur content (coal with a sulfur concentration exceeding 3%) is combusted may be not less than 160° C. By adjusting the exhaust gas temperature to not more than the dew point of sulfur trioxide ($SO_3$) that is at least not more than 160° C., the sulfur trioxide ($SO_3$) in the exhaust gas can be condensed and converted to sulfuric acid mist ($H_2SO_4$).

By thus lowering the temperature of the exhaust gas, which contains a large amount of sulfur trioxide ($SO_3$) generated from high sulfur content coal, to not more than the dew point of sulfur trioxide ($SO_3$), the sulfur trioxide ($SO_3$) that cannot be recovered as gypsum even in a wet flue gas desulfurizer can be recovered as sulfuric acid mist, and moreover, there is a possibility that the sulfuric acid mist ($H_2SO_4$) becomes adsorbed by the ash particles that exist at a considerable amount in the exhaust gas.

It is thus considered that by placing the sulfuric acid mist ($H_2SO_4$), which is generated at a high concentration in a boiler using high sulfur content coal, under conditions of becoming actively adsorbed by the ash particles and recovering the sulfuric-acid-mist-adsorbed ash particles thus obtained, a state where hardly any sulfur trioxide ($SO_3$) exists in the exhaust gas can be realized to prevent the sulfur components in the exhaust gas from becoming discharged into the atmosphere.

However, as mentioned above, it has recently become a problem that even when either of the methods of Non-Patent Document 1 and Patent Document 1 is used, the concentrations of mercury and other heavy metals in the exhaust gas cannot be lowered from the exhaust gas of a boiler using high sulfur content coal.

As a result of diligently examining why the phenomenon of not being able to recover heavy metals occurs, it was hypothesized that "ash particles to which a large amount of sulfuric acid mist has become adsorbed lose an ability to adsorb mercury and other heavy, metals in the exhaust gas," and the present invention was completed by finding out that by implementing measures based on this hypothesis, the concentrations of mercury and other heavy metals can be lowered even with an exhaust gas of a combustion apparatus using high sulfur content coal.

That is, the present inventors considered that when mercury and other heavy metals coexist with sulfur trioxide ($SO_3$) in an exhaust gas, the sulfur trioxide ($SO_3$) becomes adsorbed with priority over mercury and other heavy metals to active sites of non-combusted portions in the ash, etc., thereby impeding the adsorption of mercury and other heavy metals to the active sites and significantly lowering the concentrations of mercury and other heavy metals in a recovered ash. It was thus hypothesized that by lowering the temperature in the exhaust gas and performing recovery as sulfuric acid mist ($H_2SO_4$) to realize a state where hardly any sulfur trioxide ($SO_3$) exists in the exhaust gas, mercury can be made to become adsorbed effectively to mercury adsorption active sites of a mercury adsorbent that is sprayed into the exhaust gas, and as a result of diligent study, the present inventors arrived at completing the present invention.

FIG. 6 shows mercury concentrations in ash recovered in a dry precipitator 4 in an exhaust gas treating system shown in FIG. 1 when the temperature of an exhaust gas entering into the precipitator 4 is changed by a heat recovery unit 11 at a front stage of the precipitator 4. In cases where a mercury adsorbent is sprayed into the exhaust gas, the mercury adsorbent of an amount of 0.5% with respect to ash was sprayed at an exit (rear stage) of the heat recovery unit 11.

With systems in which the mercury adsorbent is not sprayed, a comparison of a general case where the dry precipitator 4 is set to a temperature of 160° C. with a case where the dry precipitator 4 is set to a low temperature (110° C.) not more than the dew point of sulfur trioxide shows that the mercury concentration in the ash recovered by the dry precipitator 4 in the case of the low temperature (110° C.) not more than the dew point of sulfur trioxide is slightly increased with respect to that in the case of the temperature of 160° C. Although this is considered to be due to improved performance of adsorption of mercury onto the ash particles and condensation of mercury due to lowering of the exhaust gas temperature, a removal rate is only approximately 10%.

Also, with the general case where the dry precipitator 4 is set to a temperature of 160° C., even when the mercury adsorbent is sprayed, the mercury concentration in the ash recovered by the dry precipitator 4 hardly differs from the case of not spraying the mercury adsorbent. This is considered to be because a large amount of sulfur trioxide ($SO_3$) exists in the exhaust gas and the sulfuric mist thus becomes adsorbed to the active sites of the mercury adsorbent, making it difficult for the mercury to become adsorbed.

On the other hand, it is considered that in the case where the mercury adsorbent is added at the low temperature (110° C.) not more than the dew point of sulfur trioxide ($SO_3$), because hardly any sulfur trioxide ($SO_3$) exists in the exhaust gas (the $SO_3$ is adhered as mist to the ash and hardly exists in the exhaust gas), mercury becomes adsorbed effectively to the mercury adsorption active sites of the mercury adsorbent that is sprayed into the exhaust gas and the mercury concentration in the mercury adsorbent thus increases significantly.

It thus became clear that in the exhaust gas system in which sulfur trioxide ($SO_3$) does not exist, the mercury in the exhaust gas becomes adsorbed to the mercury adsorbent, etc., and is removed effectively. That is, it became clear that even with an exhaust gas of a boiler using high sulfur content coal, mercury and other heavy metals can be removed effectively by spraying the mercury adsorbent into the exhaust gas upon putting the exhaust gas into a state where hardly any sulfur trioxide ($SO_3$) is contained.

FIG. 7 shows a relationship between a retention time after the exhaust gas temperature reaches the dew point of sulfur trioxide ($SO_3$) and the sulfur trioxide ($SO_3$) removal performance, and to remove sulfur trioxide ($SO_3$) efficiently, it is preferable to provide a retention time of not less than 0.1 seconds for completion of the adsorption of sulfur trioxide ($SO_3$) to the ash before adding the mercury adsorbent.

The effect of the mercury adsorbent can be improved further by decreasing the sulfur trioxide ($SO_3$) remaining at the rear stage of the heat recovery unit 11 (FIG. 1, etc.) by spraying an alkali, such as sodium carbonate ($Na_2CO_3$), into the exhaust gas at the entrance (front stage) or the exit (rear stage) of the heat recovery unit 11 to neutralizingly remove sulfur trioxide ($SO_3$) ($SO_3 + Na_2CO_3 \rightarrow Na_2SO_4 + CO_2$).

As the alkali used in the present invention, sodium carbonate, sodium bicarbonate, potassium carbonate, potassium bicarbonate, or calcium carbonate, etc., each of which is alkaline, is used.

FIG. 8 shows a relationship of a concentration of an acidic substance ($SO_3$, $Cl_2$, or HCl) in the exhaust gas and an amount of alkali added to the exhaust gas. Here, a control range in FIG. 8 is an appropriate range of the alkali supplying amount for improving the Hg removal performance. Because, besides sulfur trioxide ($SO_3$), a concentration of a chlorine component ($Cl_2$ or HCl) that improves the mercury removal performance is also decreased when the alkali is added to the exhaust gas excessively, it is preferable to measure the concentration of one or the concentrations of two or more among sulfur trioxide ($SO_3$), the chlorine component ($Cl_2$ or HCl), and mercury in the exhaust gas at the exit of the dry precipitator 4 and to spray the alkali at an amount that is in accordance with the measured concentration into the exhaust gas.

The hydrogen chloride concentration can be detected by a commercially available HCl meter, the mercury concentration can be detected by a commercially available continuous mercury monitor, and the sulfur trioxide ($SO_3$) concentration can be detected by a commercially available sulfur trioxide ($SO_3$) concentration meter.

FIG. 9 shows a variation of the mercury concentration in the exhaust gas when the alkali ($Na_2CO_3$) is added at molar equivalents with respect to the sulfur trioxide ($SO_3$) in the exhaust gas. The mercury concentration in the exhaust gas was minimized when the alkali ($Na_2CO_3$) was added at an amount of 1 molar equivalent with respect to the sulfur trioxide ($SO_3$).

In a case where the mercury adsorbent is sprayed at an intermediate position in the interior of the dry precipitator (DEP) 4, because ash, to which mercury is hardly attached, is recovered at a front stage portion of the dry precipitator 4, the adsorbent and ash, to which mercury has become adsorbed, is recovered at a rear stage portion, and the sulfur content of the ash at the front stage portion of the dry precipitator 4 can be removed by rinsing with water, the recovered ash after sulfur content removal can be put to effective use as ash that does not contain mercury.

Besides powder activated carbon, soot/dust recovery ash (coal ash), which exhibits adsorption performance and to which the sulfuric acid mist has not become attached, silica gel, alumina, zeolite, synthetic zeolite, or a metal oxide or resin based adsorbent, etc., may be used as the mercury adsorbent.

Although heavy metals besides mercury, such as selenium (Se), lead (Pb), zinc (Zn), cadmium (Cd), chromium (Cr), arsenic (As), etc., are lower in vapor pressure than mercury and the trapping performance of such heavy metals by the activated carbon in the dry precipitator 4 is high, improvement of the trapping performance by application of the present invention is seen as shown, for example, in Table 1.

Effect(s) of the Invention

According to the first and seventh aspects of the present invention, mercury and other heavy metals in the exhaust gas can be reduced in the case of combusting high sulfur content coal.

According to the second and eighth aspects of the present invention, mercury and other heavy metals in the exhaust gas can be reduced by almost 99% with respect to the concentration at the boiler exit.

According to the third and ninth aspects of the present invention, in addition to the effects of the first and seventh aspects of the present invention, the exhaust gas temperature can be adjusted readily within the same exhaust gas system because the exhaust gas temperature at the exit of the heat recovery unit 11 is adjusted according to at least one among the amount of circulation of the heating medium between the heat recovery unit 11 and the reheater 13, connected by the circulation line 15 through which the heating medium flows, or the cooler (heater for water) 25, cooling the heating medium supplied from the heat recovery unit 11, the heating medium heating amount, and the heating medium cooling amount.

According to the fourth aspect of the present invention, in addition to the effects of the first aspect of the present invention, the adsorption of sulfur trioxide ($SO_3$) to the ash can be completed before addition of the mercury adsorbent and the concentrations of mercury and other heavy metals in the exhaust gas can be reduced further.

According to the fifth and tenth aspects of the present invention, in addition to the effects of the first and seventh aspects of the present invention, corrosion of equipment can be prevented because the sulfuric acid mist is neutralized and rendered harmless by the spraying of alkali into the exhaust gas at the entrance (front stage) or the exit (rear stage) of the heat recovery unit 11.

According to the sixth and eleventh aspects of the present invention, in addition to the effects of the fifth and tenth aspects of the present invention, waste of the added alkali amount is eliminated and a contribution is made to prevention of equipment degradation because at least one among the sulfur trioxide ($SO_3$) concentration, the chlorine ($Cl_2$ or HCl) concentration, and the heavy metal concentration in the exhaust gas at the exit of the dry precipitator 4 is measured and an amount of alkali that is in accordance with the measured concentration is added into the exhaust gas.

BEST MODE FOR CARRYING OUT THE INVENTION

Embodiments of an exhaust gas treating system according to the present invention shall now be described along with the drawings.

Embodiment 1

FIG. 1 is a block diagram of an exhaust gas treating system of an embodiment. Concentrations of exhaust gas components discharged from a boiler used in the embodiment according to the present invention are: a soot/dust concentration of 20 $g/m^3N$; a NOx concentration of 200 ppm; a SOx concentration of 4000 ppm; and an Hg concentration of 10 $\mu g/m^3N$.

With the exhaust gas treating system of the present embodiment shown in FIG. 1, an exhaust gas discharged from the boiler 1 is introduced into NOx removal equipment 2, and, after elimination of nitrogen oxides in the exhaust gas to not more than 20 ppm by a denitration catalyst, etc., inside the NOx removal equipment 2, the exhaust gas is introduced into an air preheater 3. The exhaust gas introduced into the air preheater 3 undergoes heat exchange with a combustion air that is supplied to the boiler 1 and, upon being cooled, for example, to 120 to 170° C., the exhaust gas is introduced into a heat recovery unit 11. Heat of the exhaust gas introduced into the heat recovery unit 11 is recovered by heat exchange with a heating medium that flows through a heat exchanger tube, and the exhaust gas is preferably cooled to not more than a dew point of sulfur trioxide ($SO_3$), that is, for example, to 75 to 110° C. Here, the sulfur trioxide ($SO_3$) in the exhaust gas becomes adsorbed as sulfuric acid mist to ash and is guided to a dry electrostatic precipitator 4 where it is trapped along with soot/dust.

A mercury adsorbent, made up of powder activated carbon of an average particle diameter of 15 μm, is added at a front stage of the electrostatic precipitator 4 at an amount of approximately 50 $mg/m^3N$ from a mercury adsorbent supply unit 16, adsorbs mercury, and is removed by the electrostatic precipitator 4. The exhaust gas that has passed through the electrostatic precipitator 4 is raised in pressure and introduced by an induction fan 5 into a wet desulfurizer 6, which is based on a spray type limestone-gypsum method and is one example of a desulfurizer, and SOx in the exhaust gas is removed to not more than 40 ppm by gas-liquid contact. The exhaust gas, which has been cooled to a saturation gas temperature in the wet desulfurizer 6, is raised in temperature by a reheater 13 and then discharged from a chimney 8 via a desulfurization fan 7. As with the heat recovery unit 11, the reheater 13 is a heat exchanger having a heat exchanger tube through which the heating medium flows, and the exhaust gas is raised in temperature, for example, to 90 to 110° C. by heat exchange with the heating medium that flows through the heat exchanger tube. The heat exchanger tubes of the heat recovery unit 11 and the reheater 13 are made to communicate by the heating medium circulating ducts 15-1 and 15-2, and the heating medium is made to circulate between the heat recovery unit 11 and the reheater 13 by a pump 10.

An exhaust gas thermometer 20 is disposed to measure an exit exhaust gas temperature of the heat recovery unit 11. Also, a controller 24 is installed to determine an amount of the heating medium circulated by the heating medium pump 10, etc., to control the exit exhaust gas temperature of the heat recovery unit 11 based on a measurement result of the exhaust gas thermometer 20.

Although not illustrated, control of the exhaust gas temperature by the heating medium flow rate may also be performed by using one or more among a means that cools the heating medium, a means that heats the heating medium, and a means of adjusting the heating medium flow rate in a bypass tube installed so as to shortcut an entrance and an exit of the heating medium duct passing through the heat recovery unit 11. The control of the exhaust gas temperature by the heating medium flow rate is performed in common in other embodiments as well.

The exit exhaust gas temperature of the heat recovery unit 11 may also be adjusted, without using the reheater 13, by exchange of heat with a component outside the exhaust gas system shown in FIG. 1.

With the exhaust gas treating system shown in FIG. 1, the exhaust gas temperature at the exit of the heat recovery unit 11 is controlled to not more than the temperature at which sulfur trioxide ($SO_3$) condenses to increase an efficiency of removal of the sulfuric acid mist in the exhaust gas, and further, the mercury adsorbent from the mercury adsorbent supply unit 16 is added into the exhaust gas in which sulfur trioxide ($SO_3$) hardly remains to enable an efficiency of removal of mercury in the exhaust gas to be increased.

When the exhaust gas temperature at the exit of the heat recovery unit 11 becomes not more than the condensation temperature of sulfur trioxide ($SO_3$), the controller 24 performs a control of supplying the mercury adsorbent from the mercury adsorbent supply unit 16 into the exhaust gas.

Whereas the sulfur trioxide ($SO_3$) concentration in the exhaust gas is not more than 50 ppm in a case where a sulfur content of coal used in a coal-burning boiler is not more than 2%, when coal of a high sulfur content of not less than 4% is combusted, the sulfur trioxide ($SO_3$) concentration exceeds 100 pm. It is clear that when the mercury adsorbent (activated carbon, etc.) is used in such an exhaust gas that contains a comparatively large amount of sulfur trioxide ($SO_3$), the mercury in the exhaust gas flows to a downstream side without becoming adsorbed by the adsorbent.

As mentioned above, this is presumed to be because sulfur trioxide ($SO_3$) became adsorbed to active sites of the adsorbent and the adsorbed sulfur trioxide ($SO_3$) inhibited the adsorption of the mercury in the exhaust gas.

It was found that with the exhaust gas treating system according to the present embodiment, because the sulfur trioxide ($SO_3$) in the exhaust gas at the exit side of the heat recovery unit 11 is adsorbed onto the ash, mercury is effectively adsorbed by the active sites of the mercury adsorbent to significantly increase a mercury concentration in a recovered ash and enable not less than 50% of the mercury in the exhaust gas to be removed. With inclusion of mercury removal at the wet flue gas desulfurizer 6 in the rear stage, not less than 99% of the mercury in the exhaust gas could be removed and the Hg concentration was reduced to not more than 0.1 μg/m$^3$N.

The mercury concentration in the exhaust gas can be confirmed by monitoring by a continuous mercury monitor incorporated in a measurement unit 9 disposed in front of the chimney 8, and the NOx and SOx in the exhaust gas can be confirmed to respectively meet regulation values by monitoring by respective monitors incorporated in the measurement unit 9. By monitoring by the continuous mercury monitor incorporated in the measurement unit 9 and by monitoring the NOx and SOx in the exhaust gas by respective monitors incorporated in the measurement unit 9, it could be confirmed that the respective concentrations meet the regulation values. Although plant operation is discontinued if the regulation values are deviated from, deviations from the regulation values do not occur with the present embodiment.

Although heavy metals besides mercury, such as selenium (Se), lead (Pb), zinc (Zn), cadmium (Cd), chromium (Cr), arsenic (As), etc., are lower in vapor pressure than mercury and trapping performance of such heavy metals by activated carbon in the dry precipitator 4 is, high, improvement of the trapping performance by application of the present invention is seen as shown in Table 1.

TABLE 1

| Sample position | Weight in exhaust gas (μg/m$^3$) | | | | | | |
|---|---|---|---|---|---|---|---|
| | Cr | Zn | As | Se | Cd | Sb | Pb |
| Precipitator entrance | 0.483 | 0.748 | 0.191 | 176.256 | 0.055 | 0.097 | 1.350 |
| Precipitator exit | 0.471 | 0.603 | 0.289 | 40.005 | 0.028 | 0.021 | 0.314 |
| Precipitator exit, with SO$_3$ adsorbent | 0.128 | 0.314 | 0.046 | 4.900 | 0.016 | 0.016 | 0.251 |

Also, because the sulfuric acid mist is neutralized and rendered harmless by the coal ash, which is contained in the exhaust gas and is high in alkalinity, corrosion of equipment can be prevented and it was possible to prevent corrosion of the apparatus even at one year from a start of operation.

Embodiment 2

An embodiment shown in FIG. 2 is an exhaust gas treating system with which a configuration for adding an alkali is added to the exhaust gas treating system shown in FIG. 1 and furthermore with which at least one among an SO$_3$ concentration meter 21, measuring the SO$_3$ concentration in the exit exhaust gas of the dry electrostatic precipitator 4, a hydrogen chloride concentration meter 22, measuring a hydrogen chloride concentration, and a heavy metal concentration meter 23, measuring a heavy metal concentration, is disposed.

With the configuration shown in FIG. 2, the boiler 1, the NOx removal equipment 2, the air preheater 3, the heat recovery unit 11, the induction fan 5, the wet desulfurizer 6, the reheater 13, the desulfurization fan 7, the measurement unit 9, the chimney 8, the pump 10, the heating medium circulating ducts 15-1 and 15-2, the mercury adsorbent supply unit 16, the thermometer 20 at the heat recovery unit exit, and the controller 24 are the same as those of Embodiment 1 and description thereof shall be omitted.

The exit exhaust gas temperature of the heat recovery unit 11 may also be adjusted, without using the reheater 13, by exchange of heat with a component outside the exhaust gas system shown in FIG. 1.

In the present embodiment, because the alkali (for example, coal ash) from an alkali supply unit 17 is sprayed into the exhaust gas at a front stage of the heat recovery unit 11 to reduce the concentration of sulfur trioxide (SO$_3$) introduced into the electrostatic precipitator 4 and to neutralize and render harmless the sulfuric acid mist, the corrosion of the equipment can be prevented.

An alkali supplying amount from the alkali supply unit 17 is controlled based on a command from the controller 24 based on a measurement value of at least one among the SO$_3$ concentration meter 21, the hydrogen chloride concentration meter 22, and the heavy metal concentration meter 23.

The mercury adsorbent is added from the mercury adsorbent supply unit 16 in the exhaust gas at the front stage of the electrostatic precipitator 4, the mercury in the exhaust gas is adsorbed by the mercury adsorbent, and the mercury adsorbent that has adsorbed mercury is recovered by the electrostatic precipitator 4. The exhaust gas that has been subject to dust precipitation at the electrostatic precipitator 4 is raised in pressure and introduced by the induction fan 5 into the wet desulfurizer 6, which is based on the spray type limestone-gypsum method and is one example of the desulfurizer, and the SOx in the exhaust gas is removed by gas-liquid contact. The exhaust gas, which has been cooled to the saturation gas temperature in the wet desulfurizer 6, is raised in temperature by the reheater 13 and then discharged from the chimney 8 via the desulfurization fan 7. As with the heat recovery unit 11, the reheater 13 is a heat exchanger having the heat exchanger tube through which the heating medium flows, and the exhaust gas is raised in temperature, for example, to 90 to 110° C. by heat exchange with the heating medium that flows through the heat exchanger tube.

With the exhaust gas treating system shown in FIG. 2, because the alkali is sprayed into the exhaust gas at the front stage or the rear stage of the heat recovery unit 11 and further the sulfur trioxide (SO$_3$) in the exhaust gas is condensed as the sulfuric acid mist by controlling the exhaust gas temperature at the exit of the heat recovery unit 11 by the heating medium circulation amount of the pump 10 based on the exhaust gas temperature measurement value of the exhaust gas thermometer 20, components derived from sulfur trioxide (SO$_3$) are neutralized and the removal efficiency thereof is made higher than that of the exhaust gas treating system of Embodiment 1. By the mercury adsorbent being added, based on a command of the controller 24, from the mercury adsorbent supply unit 16 into the exhaust gas that has thus been put into a state where hardly any sulfur trioxide (SO$_3$) exists, the removal efficiency of mercury in the exhaust gas can be improved.

Although not illustrated, control of the exhaust gas temperature by the heating medium flow rate in the heating medium circulating ducts 15-1 and 15-2 may be performed not by control of the heating medium flow rate by the pump 10 but by using one or more among a means that cools the heating medium, a means that heats the heating medium, and a means of adjusting the heating medium flow rate in a bypass tube that is installed so as to shortcut the entrance and the exit of the heating medium duct passing through the heat recovery unit 11.

Because if an excessive amount of alkali is added from the alkali supply unit 17, the concentration of the chlorine components (Cl2, HCl) that improve the mercury removal performance is reduced besides the sulfur trioxide (SO$_3$) as shown in FIG. 8, it is preferable to measure one or two or more component concentrations among the sulfur trioxide concentration, the hydrogen chloride concentration, and the mercury concentration at the exit of the electrostatic precipitator 4 and to spray the alkali according to the measured concentration.

By continuously detecting the chlorine component concentration by the HCl meter 22 and suppressing the alkali supplying amount from the alkali supply unit 17 before a chlorine concentration decrease amount increases, the chlorine amount necessary for oxidation of mercury is prevented from decreasing further by a dechlorination reaction due to the addition of the alkali.

Although the front stage of the heat recovery unit 11 is preferable as the alkali spraying position, the alkali may be mixed in advance with the mercury adsorbent to be added at the rear stage of the heat recovery unit 11, and the alkali may thereby be added from the mercury adsorbent supply unit 16 to prevent a cost increase that accompanies adding of the alkali supply unit 17.

As in Embodiment 1, even with coal having a sulfur content of not less than 4%, there is no possibility of impediment of the adsorption of mercury at the active sites of the mercury adsorbent (activated carbon) if the mercury adsorbent is added into the exhaust gas with which the sulfur trioxide ($SO_3$) concentration in the exhaust gas has been reduced adequately.

Even with the present embodiment, the mercury concentration in the recovered ash at the electrostatic precipitator 4 increased significantly, not less than 60% of the mercury in the exhaust gas could be removed, and with the inclusion of the mercury removal by the wet flue gas desulfurizer 6 at the rear stage, not less than 99% of the mercury in the exhaust gas could be removed.

At the measurement unit 9, the hazardous components in the exhaust gas were monitored continuously by the continuous mercury analyzer, the NOx meter, and the SOx meter and meeting of the regulation values was confirmed.

Because in addition to the coal ash of high alkalinity that is contained in the exhaust gas, the alkali is accordingly added into the exhaust gas to neutralize and render harmless the sulfuric acid mist, the corrosion of the equipment can be prevented and it was possible to prevent the corrosion of the apparatus even at one year from the start of operation.

The exit exhaust gas temperature of the heat recovery unit 11 may also be adjusted, without using the reheater 13, by exchange of heat with a component outside the exhaust gas system shown in FIG. 1.

Embodiment 3

An embodiment shown in FIG. 3 is a block diagram of an exhaust gas treating system, with which the mercury adsorbent supply unit 16 of the exhaust gas treating system shown in FIG. 1 is disposed not at the front stage portion of the electrostatic precipitator 4 but at an intermediate position of the electrostatic precipitator 4.

Besides the mercury adsorbent supply unit 16 and the electrostatic precipitator 4, the configuration shown in FIG. 3 has the same boiler 1, NOx removal equipment 2, air preheater 3, heat recovery unit 11, induction fan 5, wet desulfurizer 6, reheater 13, desulfurization fan 7, measurement unit 9, chimney 8, pump 10, heating medium circulating ducts 15-1 and 15-2, the mercury adsorbent supply unit 16, thermometer 20 at the heat recovery unit exit, and controller 24 as those of Embodiment 1 and description thereof shall be omitted.

Although not illustrated, control of the exhaust gas temperature by the heating medium flow rate in the heating medium circulating ducts 15-1 and 15-2 may be performed not by control of the heating medium, flow rate by the pump 10 but by using one or more among a means that cools the heating medium, a means that heats the heating medium, and a means of adjusting the heating medium flow rate in a bypass tube that is installed so as to shortcut the entrance and the exit of the heating medium duct passing through the heat recovery unit 11.

The exit exhaust gas temperature of the heat recovery unit 11 may also be adjusted, without using the reheater 13, by exchange of heat with a component outside the exhaust gas system shown in FIG. 1.

With the present system, the precipitator 4 has a serial, two-stage structure, and from a front stage section, ash with sulfur trioxide ($SO_3$) attached but with hardly any mercury attached was recovered. Meanwhile, from a second rear stage section, to the rear of the portion at which the mercury adsorbent supply unit 16 is disposed, ash with mercury attached was recovered. With the ash with hardly any mercury attached, effective use as mercury-free ash is possible after removal of the sulfur trioxide ($SO_3$) by rinsing with water, etc.

Although in the present embodiment, the mercury adsorbent is added to an intermediate position of a single precipitator 4, two precipitators 4 may be disposed successively in series in the exhaust gas flow path and the mercury adsorbent supply unit 16 may be disposed between the precipitators to add the mercury adsorbent into the exhaust gas.

With the present system, because the sulfur trioxide ($SO_3$) in the exhaust gas is adsorbed to the ash at the exit of the heat recovery unit 11 and the mercury adsorbent is thus added into the exhaust gas in which hardly any sulfur trioxide ($SO_3$) exists, the mercury was adsorbed effectively by the adsorbent, the mercury concentration in the recovered ash was increased significantly, not less than 50% of the mercury in the exhaust gas could be removed, and with the inclusion of the mercury removal at the wet flue gas desulfurizer 6 in the rear stage, not less than 99% of the mercury in the exhaust gas could be removed.

Embodiment 4

An embodiment shown in FIG. 4 is an exhaust gas treating system, with which a configuration for adding the alkali to the exhaust gas treating system shown in FIG. 3 and with which at least one among the $SO_3$ concentration meter 21, measuring the $SO_3$ concentration in the exit exhaust gas of the electrostatic precipitator 4, the hydrogen chloride concentration meter 22, measuring the hydrogen chloride (HCl) concentration, and the heavy metal concentration meter 23, measuring the heavy metal concentration, is disposed at the exit of the electrostatic precipitator 4.

With the configuration shown in FIG. 4, the boiler 1, the NOx removal equipment 2, the air preheater 3, the electrostatic precipitator 4, the heat recovery unit 11, the induction fan 5, the wet desulfurizer 6, the reheater 13, the desulfurization fan 7, the measurement unit 9, the chimney 8, the pump 10, the heating medium circulating ducts 15-1 and 15-2, the mercury adsorbent supply unit 16, the thermometer 20 at the heat recovery unit exit, and the controller 24 are the same as those of Embodiment 3, and the alkali supply unit 17 is the same as this of Embodiment 2, description thereof shall be omitted.

Although not illustrated, control of the exhaust gas temperature by the heating medium flow rate in the heating medium circulating ducts 15-1 and 15-2 may be performed not by control of the heating medium flow rate by the pump 10 but by using one or more among a means that cools the heating medium, a means that heats the heating medium, and a means of adjusting the heating medium flow rate in a bypass tube that is installed so as to shortcut the entrance and the exit of the heating medium duct passing through the heat recovery unit 11.

The exit exhaust gas temperature of the heat recovery unit 11 may also be adjusted, without using the reheater 13, by exchange of heat with a component outside the exhaust gas system shown in FIG. 1.

Also, the controller 24 determines the heating medium circulation amount of the heating medium pump 10, etc., for controlling the exit exhaust gas temperature of the heat recovery unit 11 based on the measurement result of the exhaust gas thermometer 20 that measures the exit exhaust gas temperature of the heat recovery unit 11, and the controller 24 performs control to supply the mercury adsorbent in the exhaust gas from the mercury adsorbent supply unit 16 when the exhaust gas temperature at the exit of the heat recovery unit 11 becomes not more than the condensation temperature of sulfur trioxide ($SO_3$).

In the present embodiment, because the alkali (for example, coal ash) from an alkali supply unit 17 is sprayed into the exhaust gas at the front stage of the heat recovery unit 11 to reduce the concentration of sulfur trioxide ($SO_3$) introduced into the electrostatic precipitator 4 and to neutralize and render harmless the sulfuric acid mist, the corrosion of the equipment can be prevented.

The alkali supply amount from the alkali supply unit 17 is controlled based on the command from the controller 24 based on the measurement value of at least one among the $SO_3$ concentration meter 21, the hydrogen chloride concentration meter 22, and the heavy metal concentration meter 23 that measures the heavy metal concentration.

Although the front stage of the heat recovery unit 11 is preferable as the alkali spraying position, the alkali may be mixed in advance with the mercury adsorbent to be added at the rear stage of the heat recovery unit 11, and the alkali may be added from the mercury adsorbent supply unit 16 to prevent a cost increase that accompanies the adding of the alkali supply unit 17.

Embodiment 5

FIG. 10 shows a block diagram of Embodiment 5, with which the exit exhaust gas temperature of the heat recovery unit 11 is adjusted, without using the reheater 13 of the exhaust gas treating system shown in FIG. 1, by exchange of heat with a component outside the exhaust gas system.

With the configuration shown in FIG. 10, the boiler 1, the NOx removal equipment 2, the air preheater 3, the electrostatic precipitator 4, the heat recovery unit 11, the induction fan 5, the wet desulfurizer 6, the desulfurization fan 7, the measurement unit 9, the chimney 8, the mercury adsorbent supply unit 16, the thermometer 20 at the heat recovery unit exit, and the controller 24 are the same as those of Embodiment 1 and description thereof shall be omitted.

With the present system, the heating medium that recovers heat from the exhaust gas at the heat recovery unit 11 is introduced by the heating medium circulating duct 15-1 into a feed-water heater (a heating medium cooler) 25 and after performing feed-water heating of the boiler, the heating medium is introduced again into the heat recovery unit 11 by the heating medium circulating duct 15-2.

The heating medium is circulated between the heat recovery unit 11 and feed-water heater 25 by the pump 10. In addition, the exhaust gas thermometer 20 is disposed to measure the exit exhaust gas temperature of the heat recovery unit 11. Also, the controller 24 is installed to determine the amount of the heating medium circulated by the heating medium pump 10, etc., to control the exit exhaust gas temperature of the heat recovery unit 11 based on the measurement result of the exhaust gas thermometer 20.

The control of the exhaust gas temperature by the heating medium flow rate may also be performed by using a means that cools the heating medium, by using a means that heats the heating medium, and by installing a bypass tube 26 that shortcuts an entrance and an exit of the heating medium circulating ducts 15-1 and 15-2 passing through the heat recovery unit 11 and using a heating medium flow control valve 27 for adjusting the heating medium flow rate inside the bypass tube 26.

In the present system, the configuration, shown in FIG. 2, having the alkali supply unit 17 and having at least one among the $SO_3$ concentration meter 21, measuring the $SO_3$ concentration in the exit exhaust gas of the dry electrostatic precipitator 4, the hydrogen chloride concentration meter 22, measuring the hydrogen chloride concentration, and the heavy metal concentration meter 23, measuring the heavy metal concentration, disposed at the exit of the electrostatic precipitator 4, or the configuration, shown in FIG. 3, having the mercury adsorbent supply unit 16 disposed at the intermediate position of the dry electrostatic precipitator 4, or the configuration, shown in FIG. 4, that combines the configurations shown in FIGS. 2 and 3 may be adopted.

With the present system, because the sulfur trioxide ($SO_3$) in the exhaust gas is adsorbed to the ash at the exit of the heat recovery unit 11 and the mercury adsorbent is thus added into the exhaust gas in which hardly any sulfur trioxide ($SO_3$) exists, the mercury was adsorbed effectively by the adsorbent, the mercury concentration in the recovered ash was increased significantly, not less than 50% of the mercury in the exhaust gas could be removed, and with the inclusion of the removal of mercury at the wet flue gas desulfurizer 6 in the rear stage, not less than 99% of the mercury in the exhaust gas could be removed. Also with the present system, because the boiler feed-water is heated, a contribution can be made to improving the efficiency of the boiler as well.

INDUSTRIAL APPLICABILITY

According to the present invention, the concentrations of mercury and other heavy metals in the exhaust gas discharged from a chimney can be reduced. Because the sulfuric acid mist is neutralized and rendered harmless by the coal ash that is high in alkalinity, the corrosion of the equipment can be prevented. The present invention thus has applicability not only to environmental fields but to industry and various other technical fields as an art of effectively reducing heavy metals emitted by combustion.

BRIEF DESCRIPTION OF THE DRAWINGS

FIG. 9 is a diagram of a variation of a mercury concentration in the exhaust gas when the alkali addition amount is varied with respect to the sulfur trioxide ($SO_3$) in the exhaust gas in the exhaust gas treating system according to the present invention.

DESCRIPTION OF THE REFERENCE NUMERALS

Figure 1:
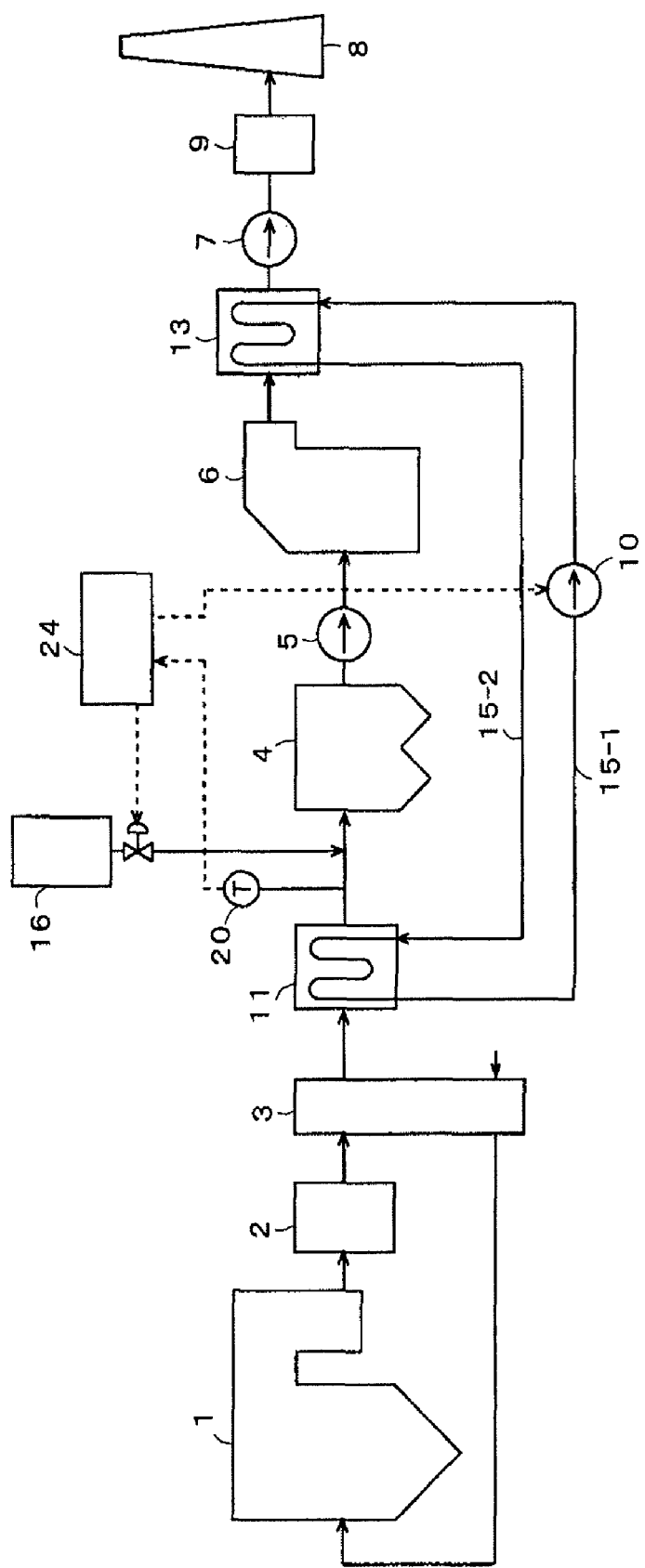
FIG. 1 is a block diagram of an exhaust gas treating system according to Embodiment 1 of the present invention.
Figure 2:
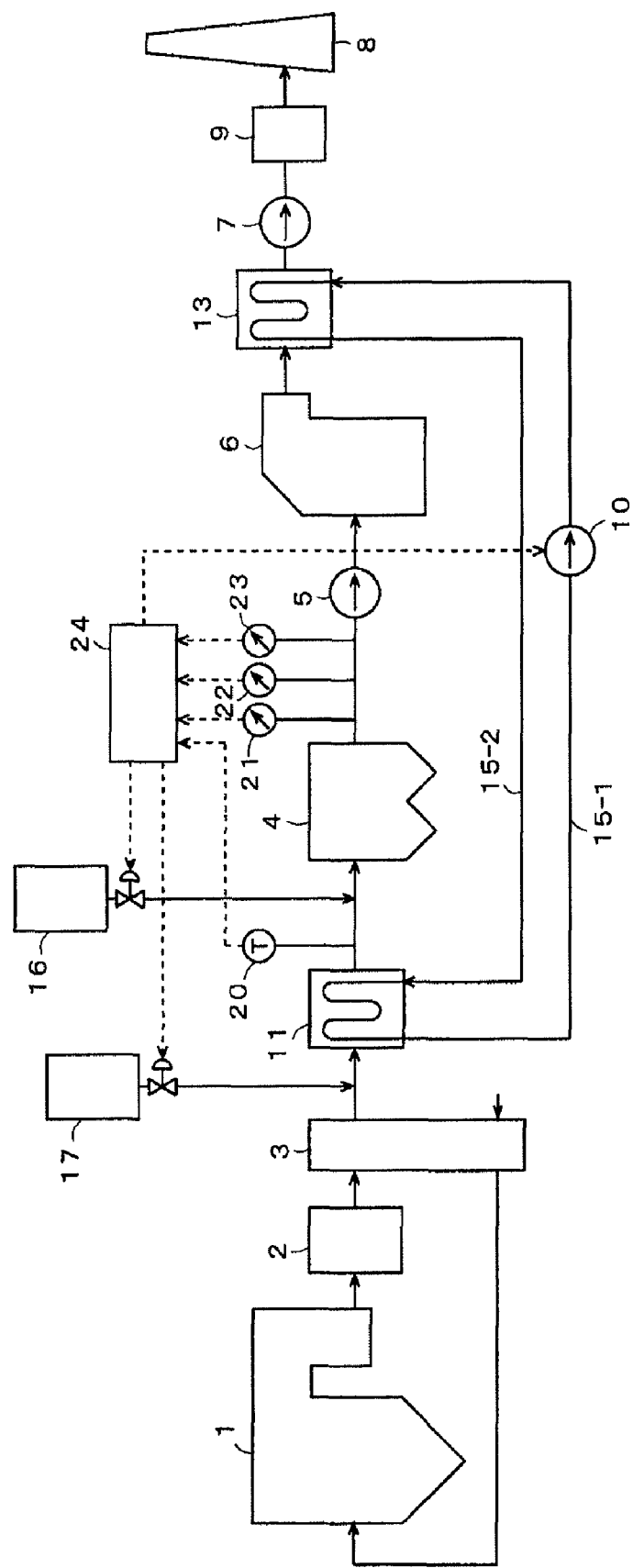
FIG. 2 is a block diagram of an exhaust gas treating system according to Embodiment 2 of the present invention.
Figure 3:
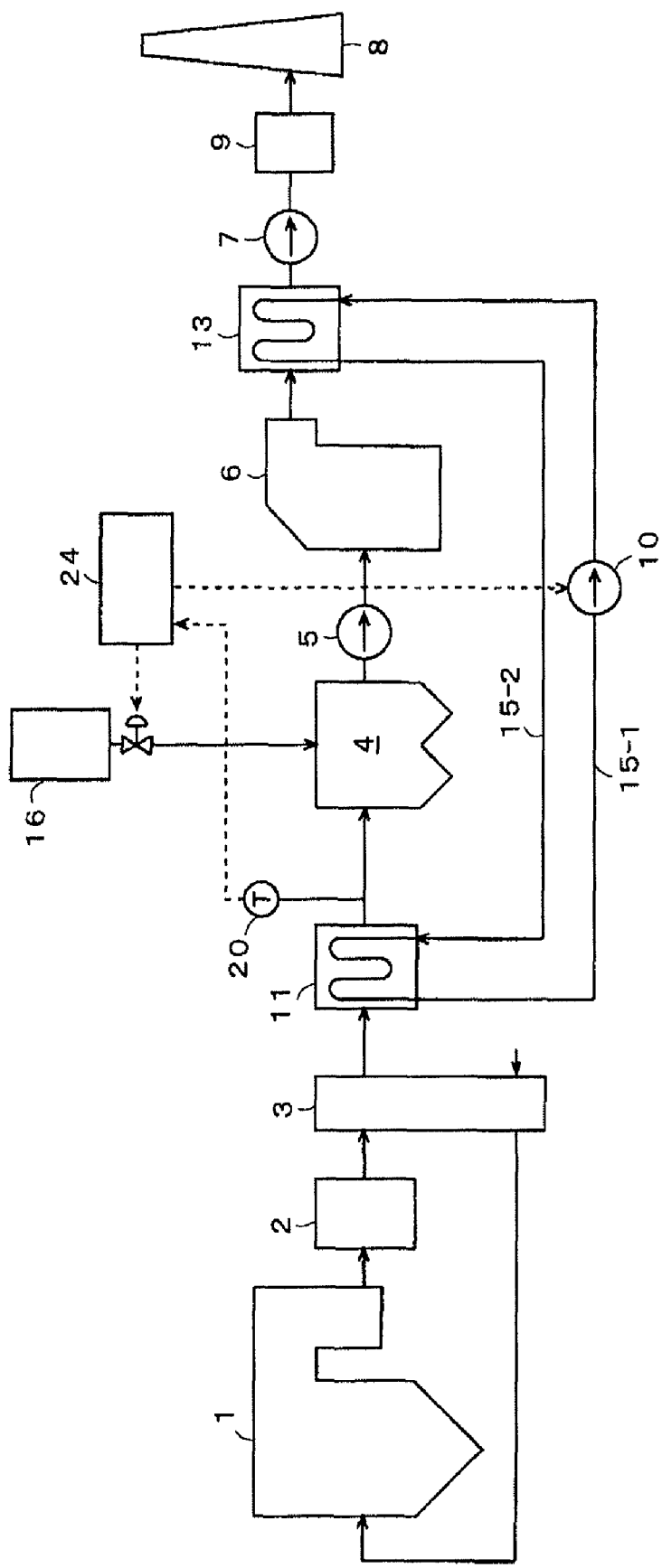
FIG. 3 is a block diagram of an exhaust gas treating system according to Embodiment 3 of the present invention.
Figure 4:
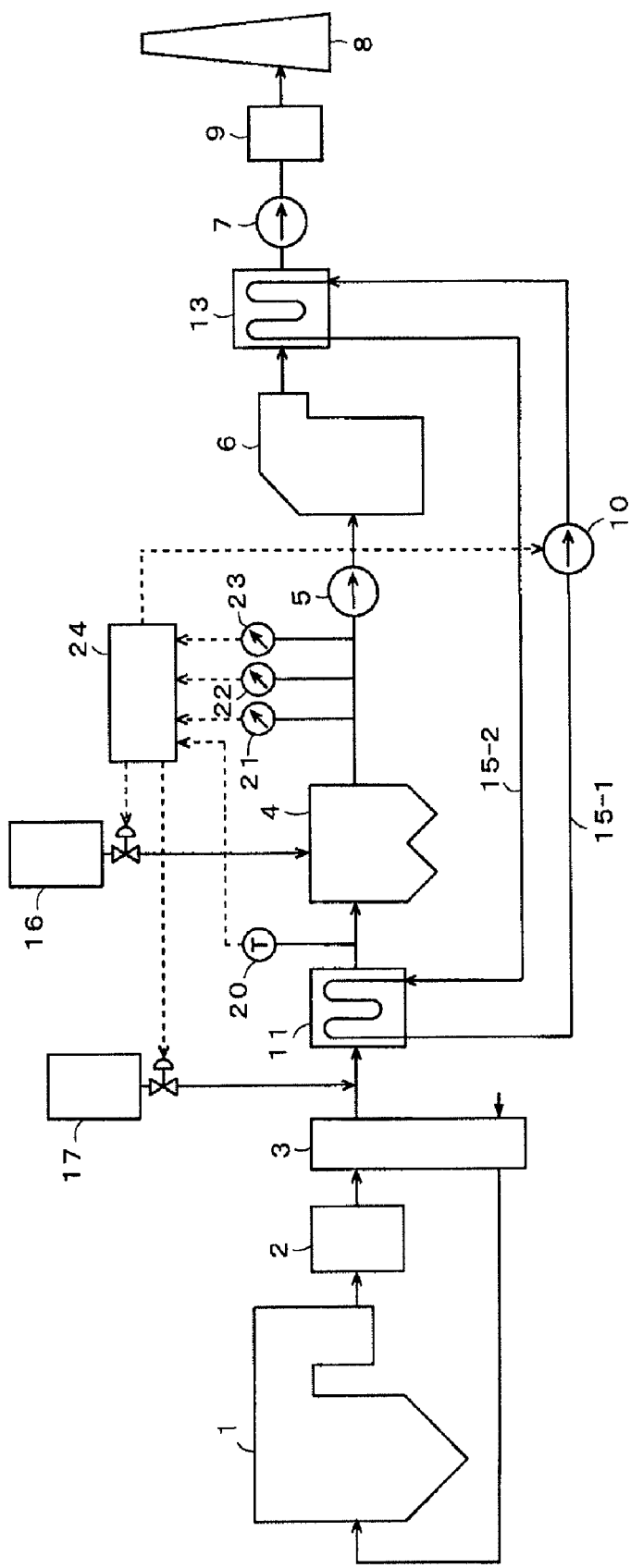
FIG. 4 is a block diagram of an exhaust gas treating system according to Embodiment 4 of the present invention.
Figure 5:
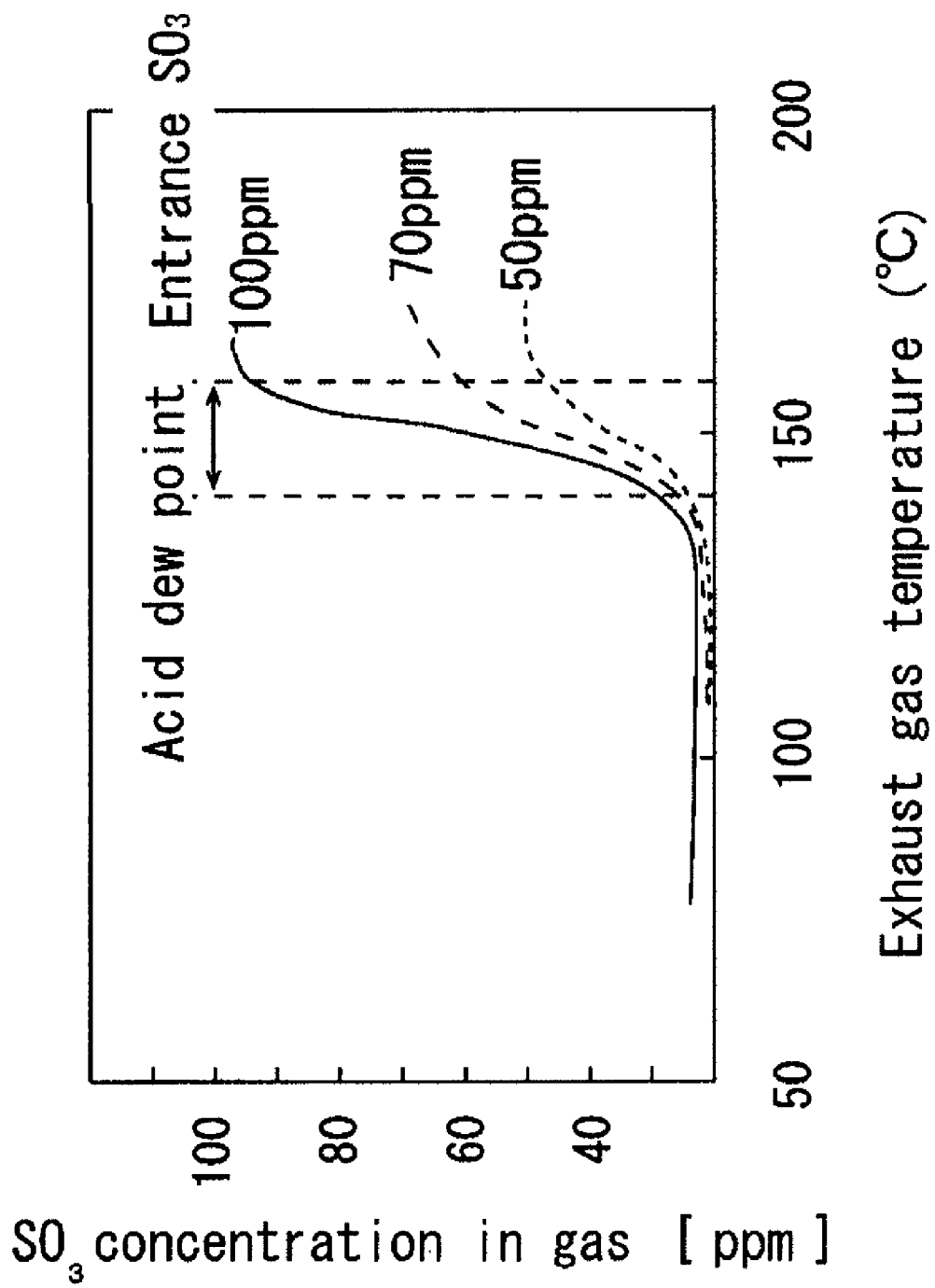
FIG. 5 is diagram of a relationship between an exhaust gas temperature and a sulfur trioxide ($SO_3$) concentration in an exhaust gas of an exhaust gas treating system according to the present invention.
Figure 6:
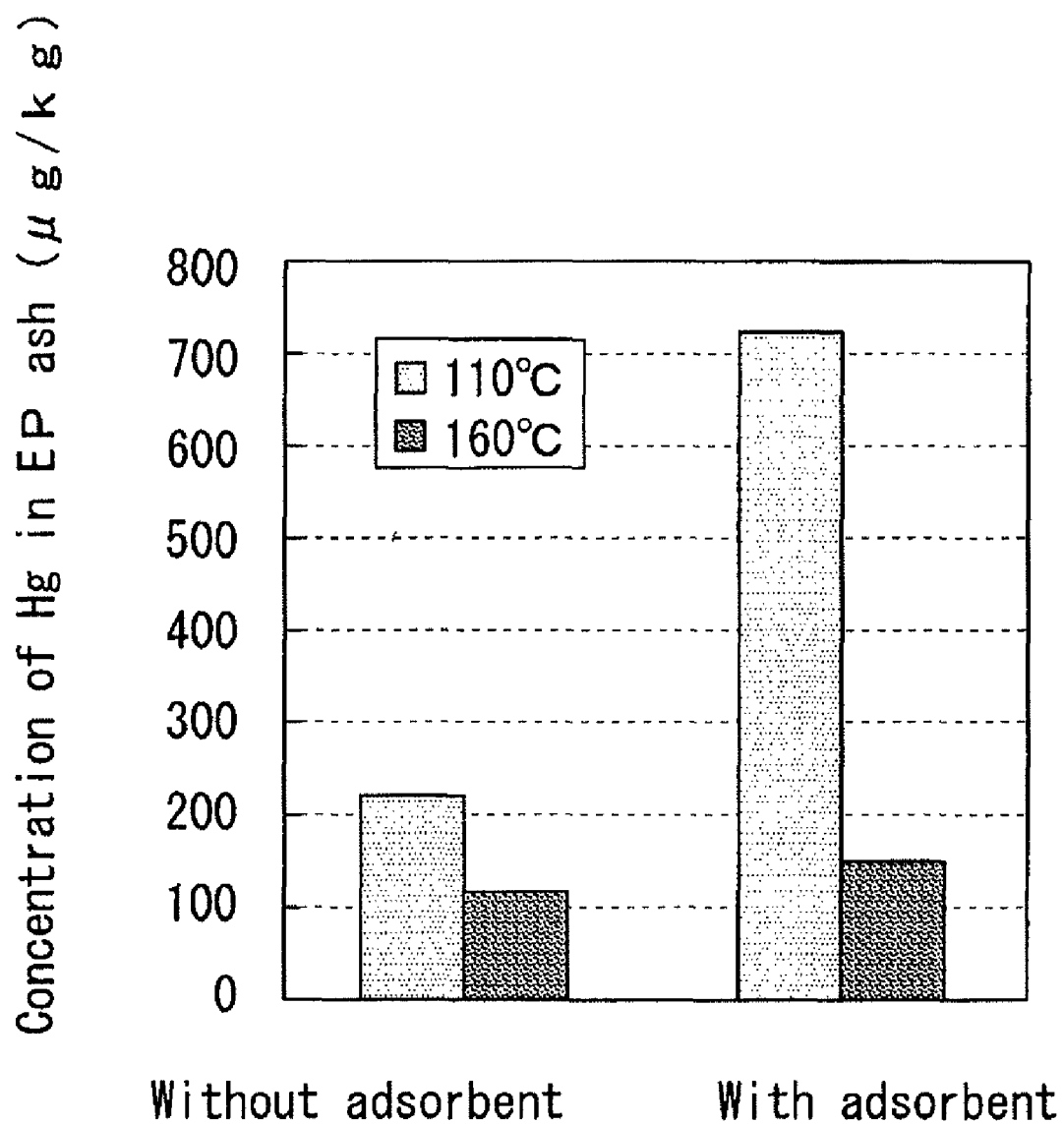
FIG. 6 is a diagram showing mercury concentrations in ash recovered in a dry precipitator under various conditions of using a mercury adsorbent in the exhaust gas treating system according to the present invention.
Figure 7:
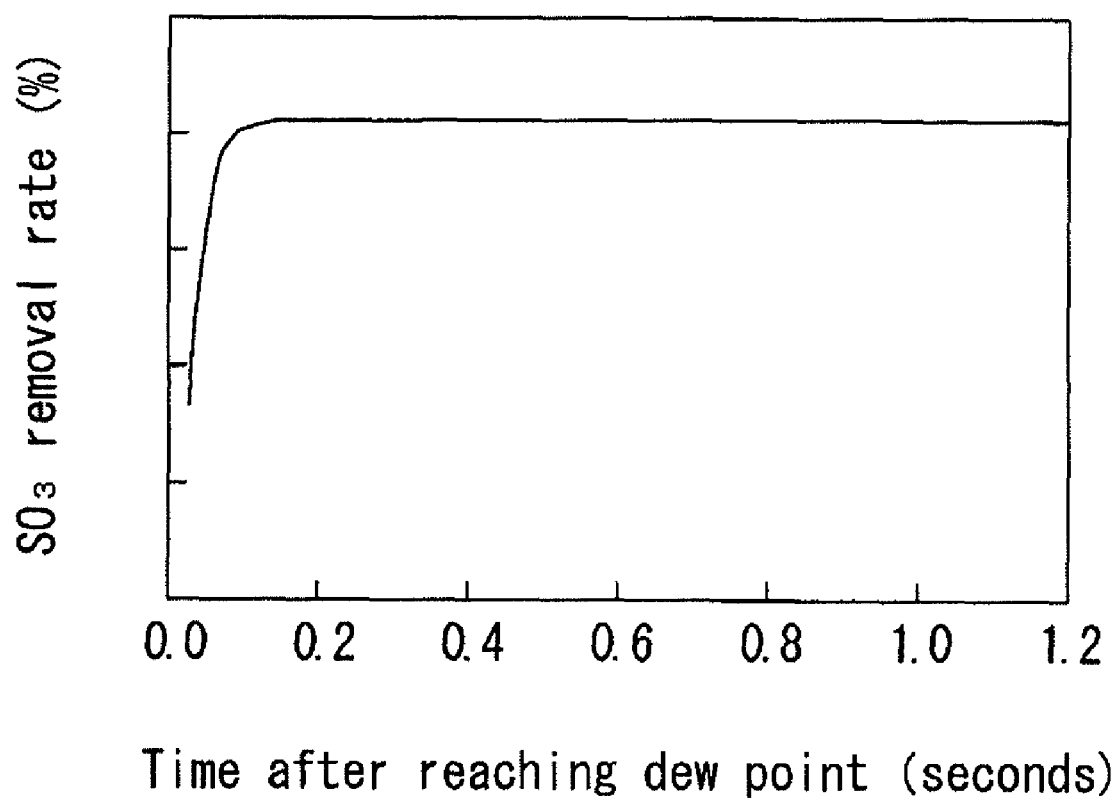
FIG. 7 is a diagram of a relationship between a retention time after the exhaust gas temperature reaches a dew point of sulfur trioxide ($SO_3$) and a sulfur trioxide ($SO_3$) removal performance in the exhaust gas treating system according to the present invention.
Figure 8:
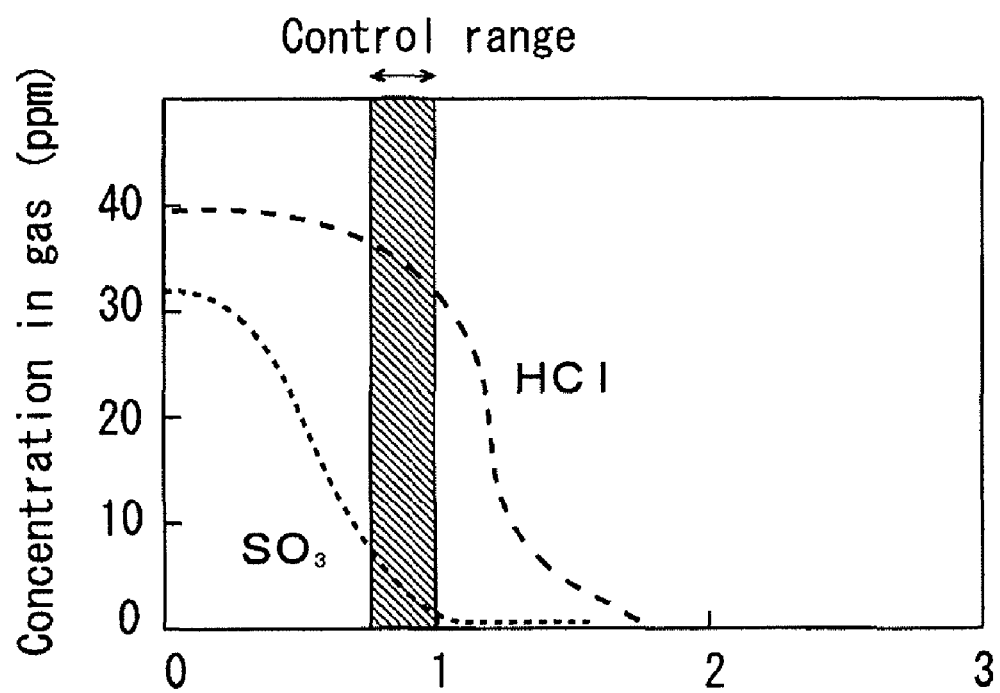
FIG. 8 is a diagram of a relationship of an added alkali amount and an acidic gas concentration in the exhaust gas treating system according to the present invention.
Figure 10:
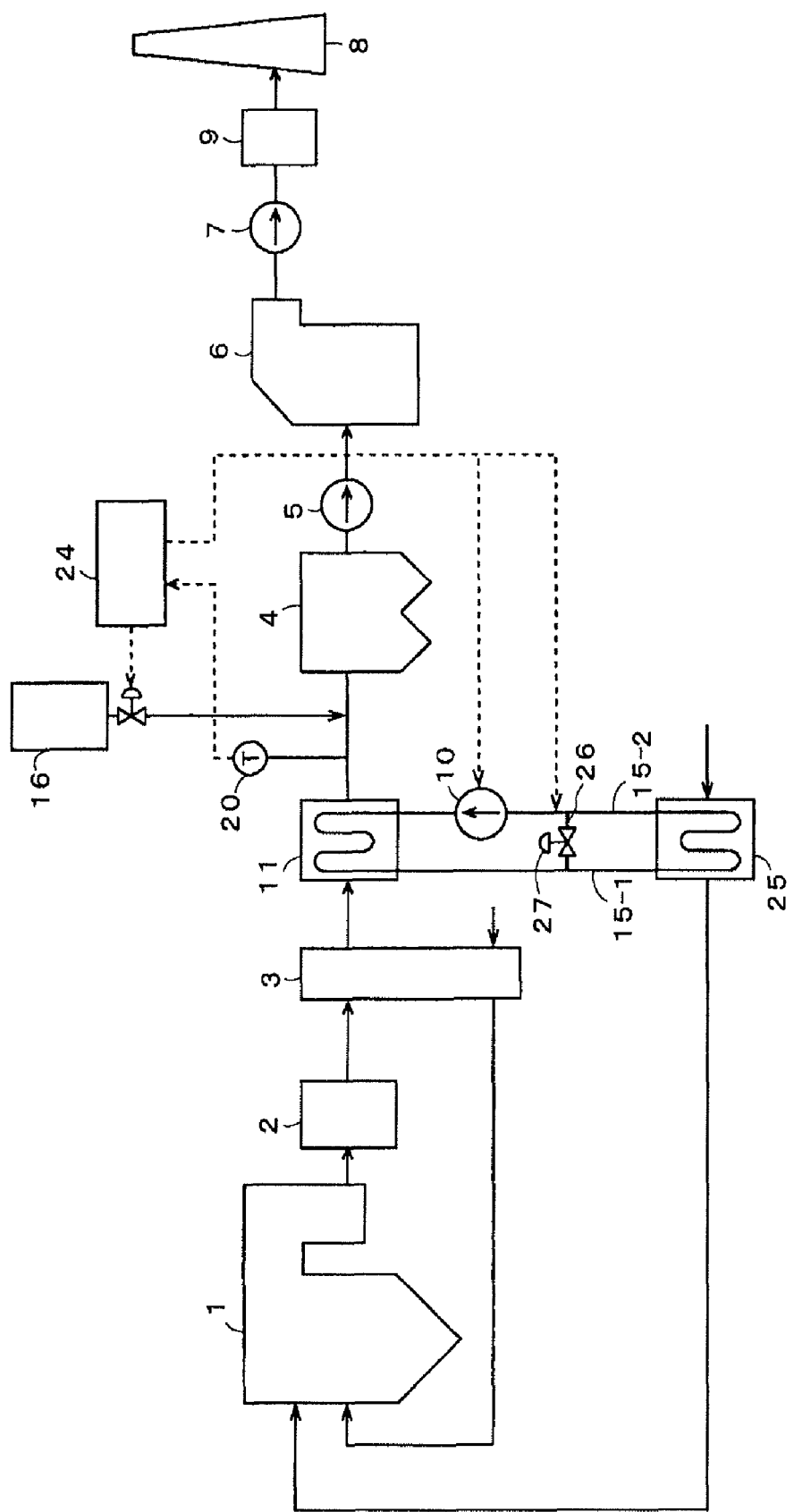
FIG. 10 is a block diagram of an exhaust gas treating system with which an exit exhaust gas temperature of a heat recovery unit is adjusted by exchange of heat with a component outside an exhaust gas system of the present invention.
Figure 11:
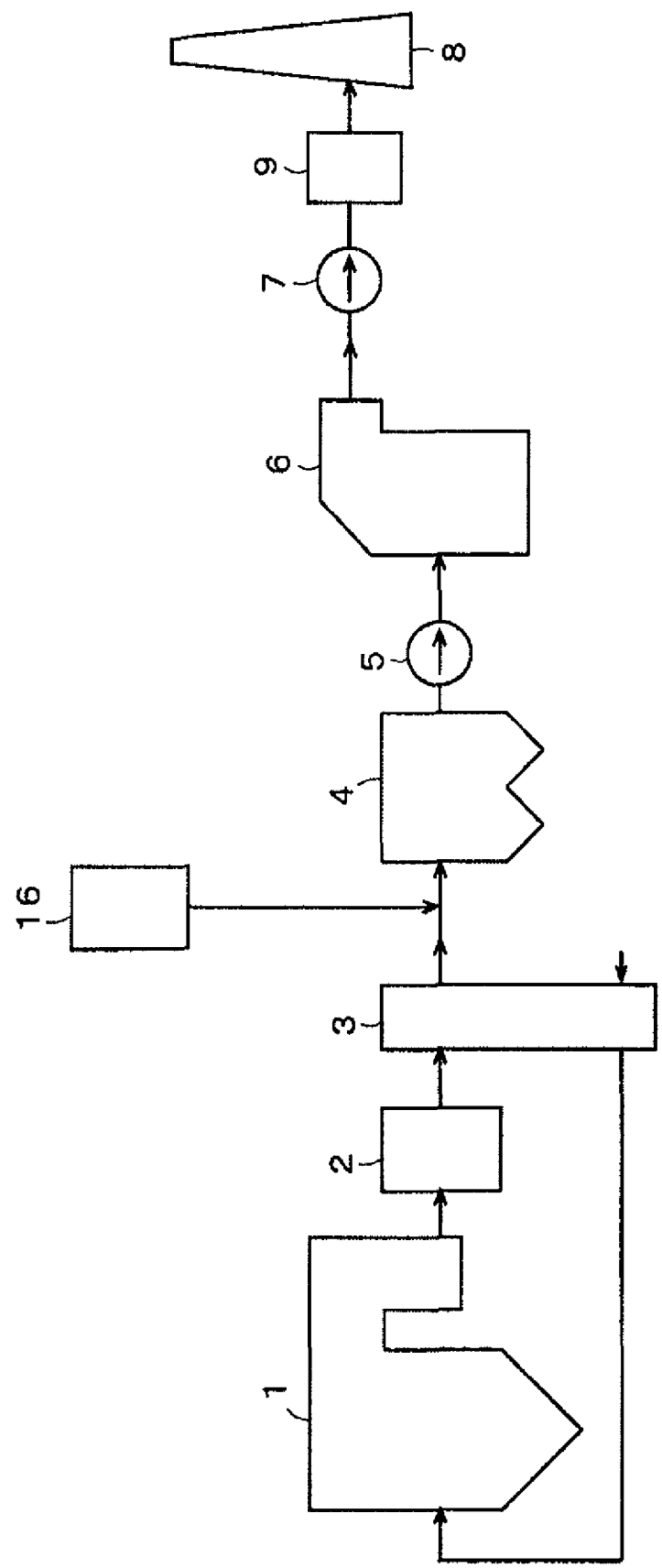
FIG. 11 is a block diagram of an exhaust gas treating system according to a conventional art.
Figure 12:
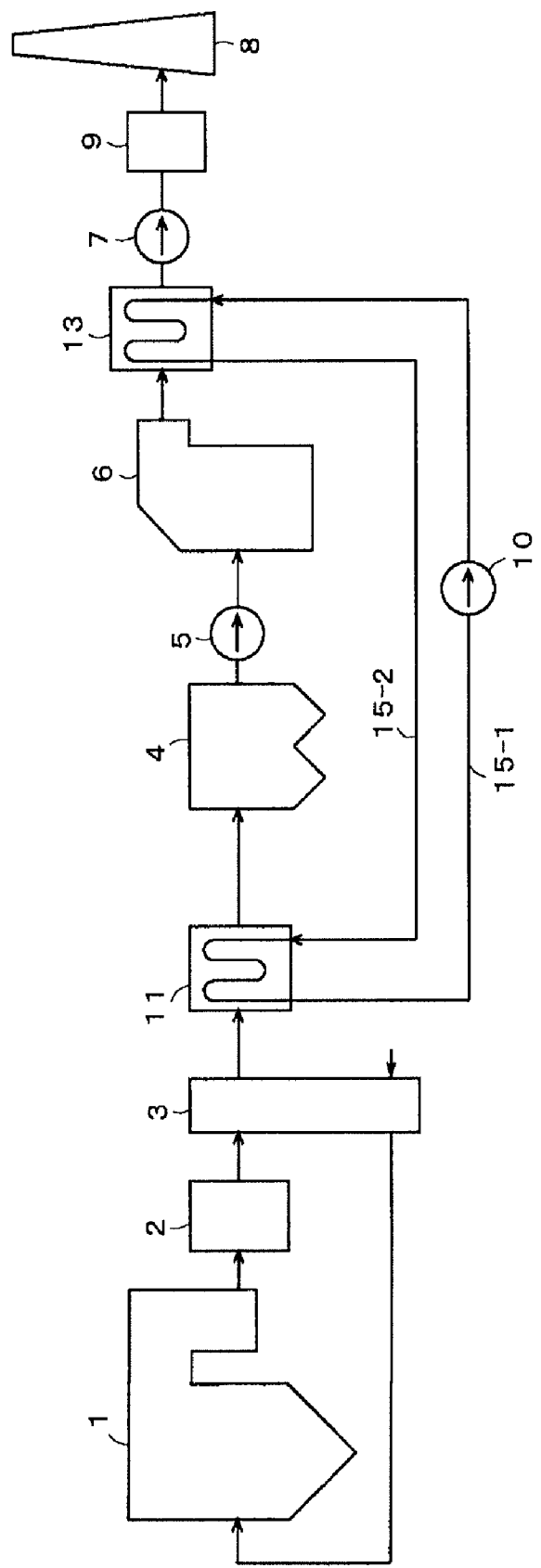
FIG. 12 is a block diagram of an exhaust gas treating system according to a conventional art.

| | |
|---|---|
| 1 combustion apparatus | 2 NOx removal equipment |
| 3 air preheater | 4 dry electrostatic precipitator |
| 5 induction fan | 6 wet flue gas desulfurizer |
| 7 boost-up fan | 8 chimney |
| 9 measurement unit | 10 pump |
| 11 heat recovery unit | 13 reheater |
| 15 heating medium circulating duct | 16 mercury adsorbent supply unit |
| 17 alkali supply unit | 20 thermometer |
| 21 $SO_3$ concentration meter | 22 hydrogen chloride concentration meter |
| 23 heavy metal concentration meter | 24 controller |
| 25 feed-water heater | 26 bypass line |
| 27 heating medium flow control valve | 28 boiler feed-water line thermometer |

What is claimed is:

1. An exhaust gas treating method comprising:
preheating a combustion air of a combustion apparatus by an exhaust gas discharged from the combustion apparatus;
recovering heat from the exhaust gas by a heat recovery unit after the air preheating; and
recovering soot/dust in the exhaust gas at an exit of the heat recovery unit by a dry precipitator; wherein
a nitrogen oxide in the exhaust gas is denitrated by a denitration catalyst before the air preheating; and
a sulfur oxide in the exhaust gas is desulfurized at the exit of the dry precipitator,
and wherein, after adjusting an exhaust gas temperature at the exit of the heat recovery unit to not more than a dew point temperature of sulfur trioxide, a heavy metal adsorbent is supplied into the exhaust gas at an entrance of the dry precipitator or into an intermediate position within the dry precipitator, and
wherein the heat of the exhaust gas is recovered in a heating medium in the heat recovery unit, the heating medium is circulatingly supplied to a reheater, disposed for heating the desulfurized exhaust gas by the heating medium supplied from the heat recovery unit, or to a cooler, disposed for cooling the heating medium supplied from the heat recovery unit, and after adjusting the exhaust gas temperature at the exit of the heat recovery unit to not more than the dew point temperature of sulfur trioxide by at least one among a circulation amount of the circulating heating medium between the heat recovery unit and the reheater, a heating amount of the heating medium, and a cooling amount of the heating medium, the heavy metal adsorbent is supplied into the exhaust gas at the entrance of the dry precipitator or into the intermediate position within the dry precipitator.

2. The exhaust gas treating method according to claim 1, wherein the heavy metal adsorbent is supplied into the exhaust gas at the entrance of the dry precipitator 0.1 seconds after adjusting the exhaust gas temperature at the exit of the heat recovery unit to not more than the dew point temperature of sulfur trioxide.

3. The exhaust gas treating method according to claim 1, wherein an alkali is sprayed into the exhaust gas at an entrance or exit of the heat recovery unit (11) and the heavy metal adsorbent is supplied after adjusting the exhaust gas temperature at the exit of the heat recovery unit to not more than the dew point temperature of sulfur trioxide.

4. The exhaust gas treating method according to claim 3, wherein at least one among a sulfur trioxide concentration, a chlorine concentration, and a heavy metal concentration in the exhaust gas at the exit of the dry precipitator is measured and an amount of the alkali that is in accordance with the measured concentration is supplied into the exhaust gas at the entrance of the heat recovery unit or the exit of the heat recovery unit.

5. An exhaust gas treating apparatus comprising: an air preheater, preheating a combustion air of the combustion apparatus by an exhaust gas discharged from the combustion apparatus; a heat recovery unit recovering heat from the exhaust gas at an exit of the air preheater; and a dry precipitator, recovering soot/dust in the exhaust gas at an exit of the heat recovery unit, which are successively disposed from an upstream side to a downstream side of an exhaust gas duct of a combustion apparatus; and further comprising;
a controller, controlling an exhaust gas temperature at the exit of the heat recovery unit to not more than a dew point temperature of sulfur trioxide; and
a heavy metal adsorbent supply unit, supplying a heavy metal adsorbent into the exhaust gas at an entrance of the dry precipitator or into an intermediate position within the dry precipitator, and
wherein the heat recovery unit comprises a set of heat exchanger tubes that recover the heat of the exhaust gas into a heating medium, and the exhaust gas treating apparatus further comprises:
a reheater in turn comprising a set of heat exchanger tubes that heat the exhaust as at an exit of the desulfurizer by the heating medium supplied from the heat recovery unit, or a cooler, in turn comprising a set of heat exchanger tubes that cool the heating medium supplied from the heat recovery unit;
a circulation line, making the heat exchanger tubes respectively disposed in the heat recovery unit and the reheater or the heat exchanger tubes respectively disposed in the heat recovery unit and the cooler communicate to make the heating medium circulate in interiors of the heat exchanger tubes; and an adjusting unit, adjusting, by the controller, at least one among a circulation amount of the heating medium flowing through the circulation line, a heating medium heating amount, and a heating medium cooling amount.

6. The exhaust gas treating apparatus according to claim 5, further comprising NOx removal equipment, in turn comprising a denitration catalyst that denitrates the exhaust gas at an entrance of the air preheater; and a desulfurizer, desulfurizing the exhaust gas at the exit of the dry precipitator.

7. An exhaust gas treating apparatus comprising: an air preheater, preheating a combustion air of the combustion apparatus by an exhaust gas discharged from the combustion apparatus; a heat recovery unit recovering heat from the exhaust gas at an exit of the air preheater; and a dry precipitator recovering soot/dust in the exhaust as at an exit of the heat recover unit which are successively disposed from an upstream side to a downstream side of an exhaust gas duct of a combustion apparatus; and further comprising;

a controller, controlling an exhaust gas temperature at the exit of the heat recovery unit to not more than a dew point temperature of sulfur trioxide; and a heavy metal adsorbent supply unit, supplying a heavy metal adsorbent into the exhaust gas at an entrance of the dry precipitator or into an intermediate position within the dry precipitator, and further comprising:

an alkali supply unit, supplying an alkali into the exhaust gas at the entrance of the heat recovery unit or the exit of the heat recovery unit and a measurement unit, measuring at least one among a sulfur trioxide concentration, a chlorine concentration, and a heavy metal concentration in the exhaust gas at the exit of the dry precipitator; and an adjusting unit, adjusting, by the controller, an amount of the alkali supplied from the alkali su unit into the exhaust as at the entrance of the heat recover unit or the exit of the heat recovery unit in accordance with the measurement values of the measurement unit.

\* \* \* \* \*